(12) United States Patent
Helfman et al.

(10) Patent No.: US 6,396,513 B1
(45) Date of Patent: May 28, 2002

(54) ELECTRONIC MESSAGE SORTING AND NOTIFICATION SYSTEM

(75) Inventors: Jonathan Isaac Helfman, Gillette, NJ (US); Charles Lee Isbell, Cambridge, MA (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 08/645,740

(22) Filed: May 14, 1996

(51) Int. Cl.[7] ............................................. G06F 15/173
(52) U.S. Cl. ..................... 345/752; 709/206; 709/207
(58) Field of Search ................... 395/200.34, 200.37; 345/347, 340, 356, 752; 379/88; 709/206, 207

(56) References Cited

U.S. PATENT DOCUMENTS

| | | | | |
|---|---|---|---|---|
| 5,283,818 A | * | 2/1994 | Klausner et al. | 379/88.25 |
| 5,400,393 A | * | 3/1995 | Knuth et al. | 379/88.27 |
| 5,557,659 A | * | 9/1996 | Hyde-Thompson | 379/88.13 |
| 5,627,764 A | * | 5/1997 | Schutzman et al. | 709/207 |
| 5,630,042 A | * | 5/1997 | McIntosh et al. | 345/744 |
| 5,687,220 A | * | 11/1997 | Finnigan | 379/88.22 |
| 5,694,616 A | * | 12/1997 | Johnson et al. | 709/207 |
| 5,699,089 A | * | 12/1997 | Murray | 345/823 |
| 5,778,356 A | * | 7/1998 | Heiny | 707/2 |
| 5,796,394 A | * | 8/1998 | Wicks et al. | 709/206 |
| 5,877,746 A | * | 3/1999 | Parks et al. | 345/835 |

FOREIGN PATENT DOCUMENTS

| | | | | |
|---|---|---|---|---|
| JP | 6-133043 | * | 5/1994 | H04M/3/42 |

OTHER PUBLICATIONS

Applied Voice Technology, Inc. "Unified Messaging Solutions." Dallas: Computer Telephony Expo, Mar. 7, 1995.*
Hasting, Bryan. "The Complete PC Offers Voice, Data, and Fax Messaging on Your PC." PC World.p. 88, May 1993.*
Applied Voice Technology, "Applied Voice Technology Announces Proprietary Digital Integration Between CallXpress3 and Northern Telecom Northstar Key Systems (News Release)", 441 words (reprinted as pp. 1–2), Aug. 18, 1992.*
Anonymous, "Fruits of LANned Phones: Will You Ever Go Back to Your PBX?", Teleconnect, v. 12, n. 3, pp. 44–51, Mar. 1994.*
Business Wire, "Applied Voice Tech: AVT Opens CallXpress3 to Third–party Developers; CallXpress3 Access SDK Voice–Mail–Enables Applications", Business Editors, 565 words (reprinted as pp. 1–2), Jun, 22, 1994.*
Business Wire, "Applied Voice Tech: AVT Ships New ROLM CBX 8004 Integration Offering Significant Competative Advantages", Business Editors, 461 words (reprinted as pp. 1–2), Jul. 14, 1994.*
Business Wire, "Applied Voice Tech: AVT Products Help Arizona School District Develop 'Classroom Information Line'", Business Editors, 519 words (reprinted as pp. 1–2), Aug. 8, 1994.*

(List continued on next page.)

Primary Examiner—Joseph H. Feild
Assistant Examiner—Jeffrey A. Rossi (57) ABSTRACT

The invention concerns an improved electronic mail system, wherein incoming mail is automatically sorted into mailboxes, based on criteria defined by the user. In addition, the user can rank the mailboxes in order of importance, and the mailboxes are presented to the user in the order of rank. The user can also establish thresholds for any measurable characteristic of a mailbox. For example, one measurable characteristic may be the total number of unread messages. The user may choose to be informed when the total number of unread messages exceeds a threshold. If the threshold is set to ten, for example, then, when the eleventh message is received, the system triggers an alarm, notifying the user. The system also includes an interface which displays multiple windows to the user simultaneously, showing not only the contents of mail messages, but also other information about the user's mail, such as the ranking of the mailboxes and the criteria for triggering alarms.

7 Claims, 8 Drawing Sheets

OTHER PUBLICATIONS

Hespe, Mary B., Universal Inbox: Where PC, Voice Mail Converge (short takes), Computer Reseller News, n. 592, p. 59 (reprinted as pp. 1–2), Aug. 22, 1994.*

Applied Voice Technology, "Voice Processing: Applied Voice Technologiy's Automated Agent Paves the Way for More Sophisticated Applications of Interactive Voice Response (press release)", Edge, v.10, n. 352, p. 18 (reprinted as pp. 1–2), Apr. 13, 1995.*

Kalman, Steve, "CTI and the Marketplace. (Integrated Technology's CompuPhone, Rochell Communications' Caller Profile and Wildfire Communications' Wildfire Computer–telephony Products)", Network VAR, v.3, n.9, pp. 49–53 (reprinted as pp. 1–5), Sep. 1995.*

Business Wire, "Applied Voice Tech: Applied Voice Technology Adds Call Center Module to Automated Agent Version 3.0", Business Editors, 778 words, (reprinted as pp. 1–2), Sep. 20, 1995.*

Business Wire, "Applied Voice Tech 2: Applied Voice Technology to Demonstrate Two New Computer–Telephony Products for Microsoft Users", Business Editors, 771 words, (reprinted as pp. 1–2), Sep. 20, 1995.*

Wolf, Jim et al., "An Open Windows on Voice and Fax", PC Magazine Network Edition, v. 13, n. 17, pp. NE44–48 (reprinted as pp. 1–3), Oct. 11, 1994.*

Kalman, Steve, "Networking on the Phones", Local Area Network (LAN) Magazine, pp. 177–182 (reprinted as pp. 1–6), Oct. 1995.*

Anonymous, "Call Processing App Gen Roundup", Teleconnect, v. 13, n. 12, pp. 56–64 (reprinted as 1–11), Dec. 1995.*

Business Wire, "Applied Voice Technology Announces Major New Release of Interactive Voice Response (IVR) Platform; Automated Agent Supports any ODBC–complient Database Management System", p. 3120120 (reprinted as pp. 1–2), Mar. 12, 1996.*

* cited by examiner

FIG 1

From: rjb@research.att.com (Ron Brachman) — 18A
To: jon@research.att.comm — 18B
CC: isbel@research.att.com — 18C
Subject: somewhat urgent request — 18D Jon, I need to mention Ishmail at a very important meeting this afternoon. I would like to get one or two scren shots of my machine (Sparc) running Ishmail. Is there an easy way to print some screen shots ?

Thanks,
Ron

18

15

ATTACHED FILE 21 23

SUMMARY

```
┌─────────────────────────────────────────────────────┐
│ □ Call me Ishmail                                 ○ │
│ Buffers File Edit Move Delete Mail Summary Classify Help │
│ 06/12/95 15:30:41 misc     ajc@pecas.mh.att.com   Building 3 $ │
│ 06/12/95 16:07:00 ishmail  isbell@research.att.com what a mail$ │
│ 06/12/95 16:06:43 misc     tcr@research.att.com   Looking for$ │
│▓▓▓▓▓▓▓▓▓▓▓▓▓▓▓▓▓▓▓▓▓▓▓▓▓▓▓▓▓▓▓▓                    │
│--##--Emacs: rmail-log       (Mail Log)--Bot---------│
│ alarms mailbox unread/tot oldest unread thresholds (age) │
│   ishmail 47 1/192   06/12/95 16:07:00   0   0   0  │
│      test    0/7     no unread mail      0   0   0  │
│ multimedia  13/56    03/16/95 18:10:00 100  13  55  │
│        rjb   0/50    no unread mail      0   0   0  │
│   julia 49  0/251    no unread mail      0   0   0  │
│     hollan   0/28 52 no unread mail      0   0   0  │
│       misc   0/99    no unread mail      0   0   0  │
│▓▓▓▓▓▓▓▓▓▓▓▓▓▓▓▓▓▓▓       ▓▓▓▓▓▓▓▓▓▓▓▓▓▓▓▓▓▓▓▓▓▓▓▓▓ │
│--##--Emacs: rmail            (Mail Summary)--Top----│
│ From: rjb@research.att.com (Ron Brachman)            │
│ To: jon@research.att.com                             │
│ CC: isbell@research.att.com                          │
│ Subject: somewhat urgent request                     │
│                                                      │
│ Jon, I need to mention Ishmail at a very important   │
│ meeting this afternoon. I would like to get one or two│
│ screen shots of my machine (Sparc) running Ishmail. Is│
│ there an easy way to me to print some screen shots ? │
│                                                      │
│ Thanks,                                              │
│ Ron                                                  │
│                                                      │
│ P.S. Charles, I am cc'ing you on the outside chance you│
│ know about something within emacs19 that lets you do │
│ this. Thanks.                                        │
│▓▓▓▓▓▓▓▓▓▓▓▓▓▓▓▓▓▓▓▓▓▓▓▓▓▓▓▓▓▓▓▓▓▓▓▓▓▓▓▓▓▓▓▓▓▓▓▓▓▓▓▓ │
└─────────────────────────────────────────────────────┘
         └─50─┘   └─────40─────┘      └──────30──────┘
```

ELECTRONIC MESSAGE SORTING AND NOTIFICATION SYSTEM

BACKGROUND OF THE INVENTION

A common type of electronic mail ("e-mail") system takes the form of one, or more, computer programs running on a server, which also runs other application programs, such as word-processing, spreadsheet, high-level language compilers, etc.

When a user logs onto the server, to use one of the application programs, the e-mail system may examine the queue of e-mail messages held in the user's mailbox. If messages are found stored in the mailbox, the system may notify the user, as by a notice stating, "You have mail." Alternately, if new messages are found, which the user has not accessed previously, the notice may instead read, "You have NEW mail."

When the user calls for the mail, the system presents a list of the messages stored in the mailbox on the user's display screen, together with selected information about each, such as the identity of the sender, the date and time of dispatch, and so on. When the user selects a message from the list, the system erases the list from the screen, and displays the selected message instead.

For a person receiving large quantities of e-mail, this procedure can be cumbersome. The person is required to 1) select a message from the list, 2) jump, in effect, to a new screen, which shows the selected message, 3) jump to the list again, to select another message, and repeat the previous seteps.

Other types of e-mail systems eliminate some of these cumbersome features, by maintaining the list of the messages in one region of the display screen, and displaying the selected message in another region. However, even this improvement is seen as lacking in optimality for intensive users of e-mail.

SUMMARY OF THE INVENTION

In one form of the invention, a recipient of e-mail messages creates multiple mailboxes, into which incoming mail is automatically sorted, based on criteria established by the user. The user can define conditions for each mailbox which trigger alarms when the conditions are met.

DETAILED DESCRIPTION OF THE INVENTION

Figure 1:
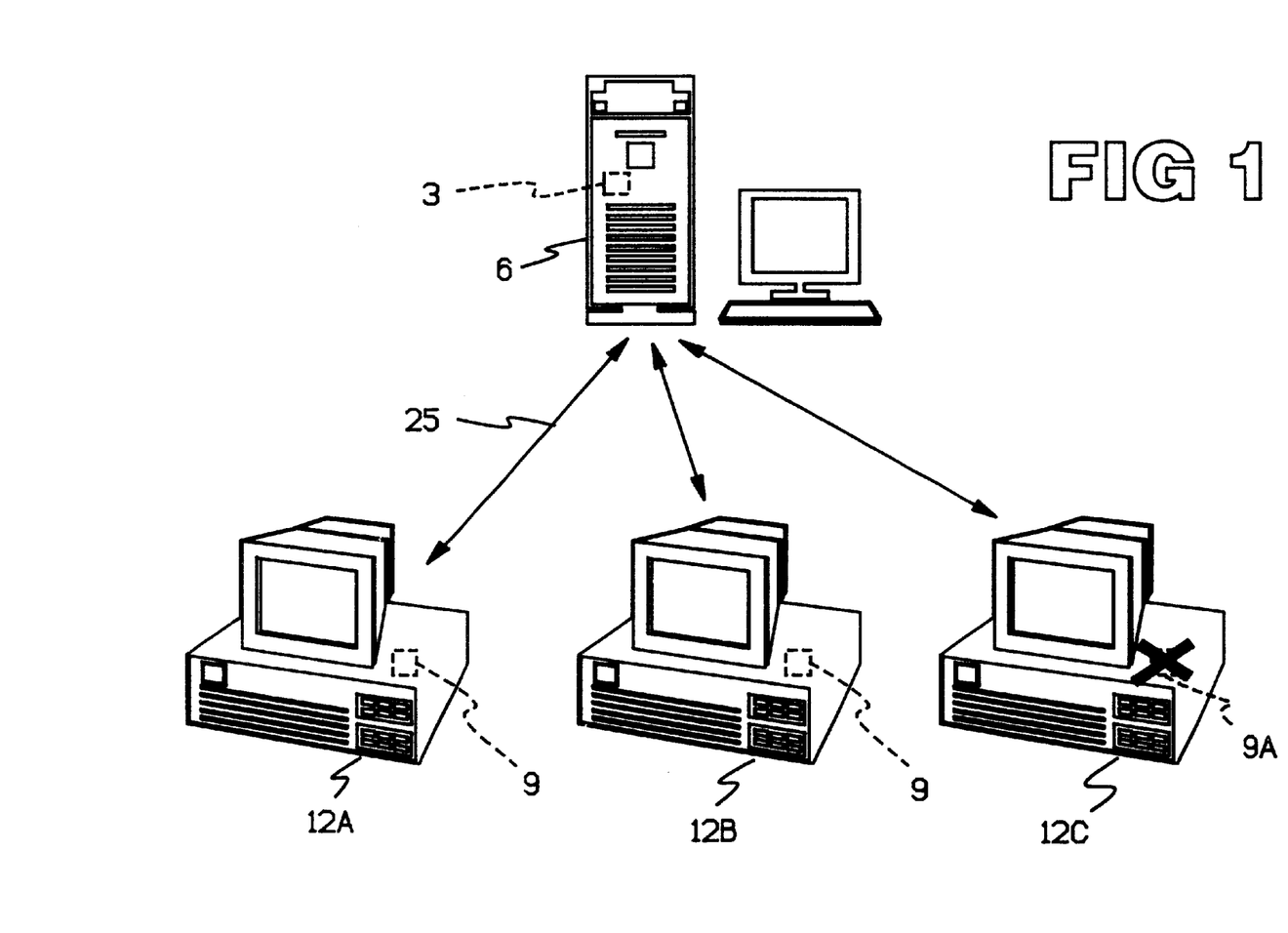
FIG. 1 illustrates a server 6 which provides electronic mail service to remote computers 12.

In one form of the invention, an electronic mail transfer-and-delivery program, indicated by phantom box 3 in FIG. 1, runs on a server 6. This program will be termed an "e-mail program" herein. This type of program is commercially available. One such program is that marketed under the name "SENDMAIL", and available from Universty of California, located in Berkeley, Calif.

The e-mail program 3 handles tasks such as (1) accepting outgoing e-mail messages from users;

(2) delivering the outgoing e-mail messages to a distribution service, for delivery to another server, containing another e-mail program, which receives and holds the messages for the message recipients;

(3) accepting incoming e-mail messages from the distribution service, for its own users;

(4) holding, or "spooling," the incoming e-mail messages for its users; and (5) delivering the spooled e-mail messages to its users, upon request.

Another program, termed "Ishmail" herein and indicated by phantom boxes 9, runs on one or more of the computers 12 served by the server 6. The Ishmail program can be classified as a type of e-mail reading system.

Use of the Ishmail program is optional on the computers 12, as indicated by the absence (signified by the "X") of a phantom box 9 on computer 12C. The presence or absence of an Ishmail program in a computer 12 does not affect the computer's normal interaction with the e-mail program 3 running on the server 6.

Figure 2:
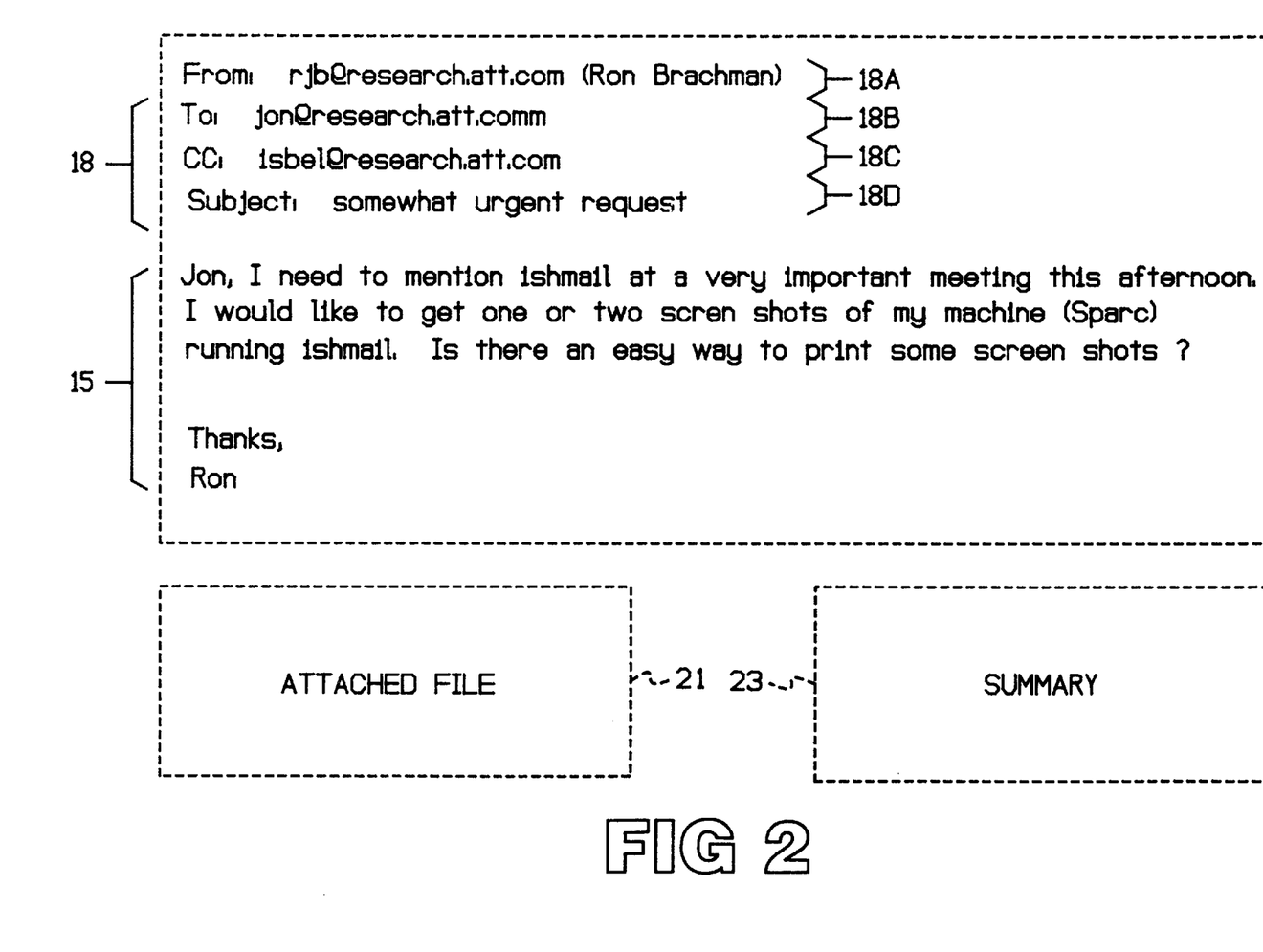
FIG. 2 illustrates an exemplary electronic mail message.

In order to describe the major features of the Ishmail program, it is desirable to first examine the basic structure of e-mail messages generally. An electronic mail message can be viewed as a packet of digital data, which is divided into fields. FIG. 2 illustrates an example.

The content 15 of the message represents one field. The header 18 represents another field. The header 18 can be divided into sub-fields. These sub-fields include the identity 18A of the sender of the message, the destination 18B, the distribution list 18C (the symbol "CC" means "carbon copy"), and the subject matter 18D of the message.

If data is appended to the message, such as a file 21, the appended data can be treated as another field. In addition, a summary, or abstract, 23 may accompany the message, and represent a brief description of the contents of the message. The summary is created by the sender of the message. The summary can be treated as another field, and additional fields can be defined.

In the general case, other fields are possible. In a particular case, the entire message itself can be considered a single field.

The e-mail program 3 in FIG. 1 stores the messages in a "spool" (not shown). When a user fetches e-mail, using a computer 12A in FIG. 1 which is equipped with the Ishmail program, the Ishmail program downloads the user's messages which are spooled in the server 6, via data link 25.

After downloading, the data packets corresponding to the user's messages become available locally at the user's computer 12A, for the Ishmail program to process. A significant processing feature of the invention allows users to establish, at their local computers 12, multiple different mailboxes, having different names. The Ishmail program sorts the messages into these mailboxes, based on information contained in the various fields of the messages.

In addition, the Ishmail program allows the user to rank the mailboxes, and the ranking changes dynamically, based on the user's interaction with the mail messages, and upon characteristics of new, incoming mail. The sorting and ranking procedures are perhaps best illustrated by example.

EXAMPLE

Sorting of Mail

In this Example, the user wishes to collect all e-mail messages originating from the user's supervisor in a single mailbox, and all other messages in another mailbox. Accordingly, the user establishes two different mailboxes within the user's local computer 9, one of which is entitled "Boss," and the other of which is entitled "General." The details of establishing these mailboxes are explained in APPENDIX A, which is a copy of a user's manual for operating the Ishmail program. However, the general steps in establishing a mailbox are the following:

(1) The user assigns a name to the mailboxes ("Boss" and "General" in this example).

(2) The user specifies the fields in the incoming messages which are to be searched, for sorting the messages into their respective mailboxes. For the "Boss" mailbox, the field identifying the sender, namely, sub-field 18A in FIG. 2, is specified. For the "General" mailbox, no field is specified, because all messsages which are not sorted into the "Boss" mailbox are sorted into the "General" mailbox, by default.

(3) The user specifies a search string, which is the sequence of characters sought in the fields specified in step 2. (In this example, the search string indicates supervisor's name.)

After the messages are downloaded into the user's local computer 12A in FIG. 1, the Ishmail program 9 examines the field 18A in FIG. 2 of all the messages, in pursuit of the specified search string, namely, the name of the supervisor. When the supervisor's name is found in sub-field 18A of any message, that message is sorted into the mailbox labeled "Boss." The remaining messages are sorted into the "General" mailbox.

This example illustrates four features of the invention. One: the user is able to create multiple mailboxes, and to assign a different name to each.

Two: the user generates a search string, or filter, and assigns the filter to a specific field within the messages.

Three: the Ishmail program searches the specified fields, for the specified search string, and, when a match is found, stores the message having the matching string in the mailbox assigned to the filter. Significantly, if the same search string exists in another field of the message, that same search string is ignored. The search is limited to the specified field. For purposes of searching, the entire message may be considered a field.

Four: the Ishmail program does not interfere with normal interaction between a computer and the e-mail program 3 in FIG. 1. That is, computer 12C can interact with the e-mail program 3, as usual, using a commercially available mail reader program, such as one supplied by the developer of the e-mail program 3. Further, computer 12A, which is equipped with Ishmail, is not required to invoke Ishmail, but can also interact with the e-mail program 3, in the same manner as computer 12C, if equipped with ANOTHER a mail reader program.

Prioritizing and Ranking

Figure 5:
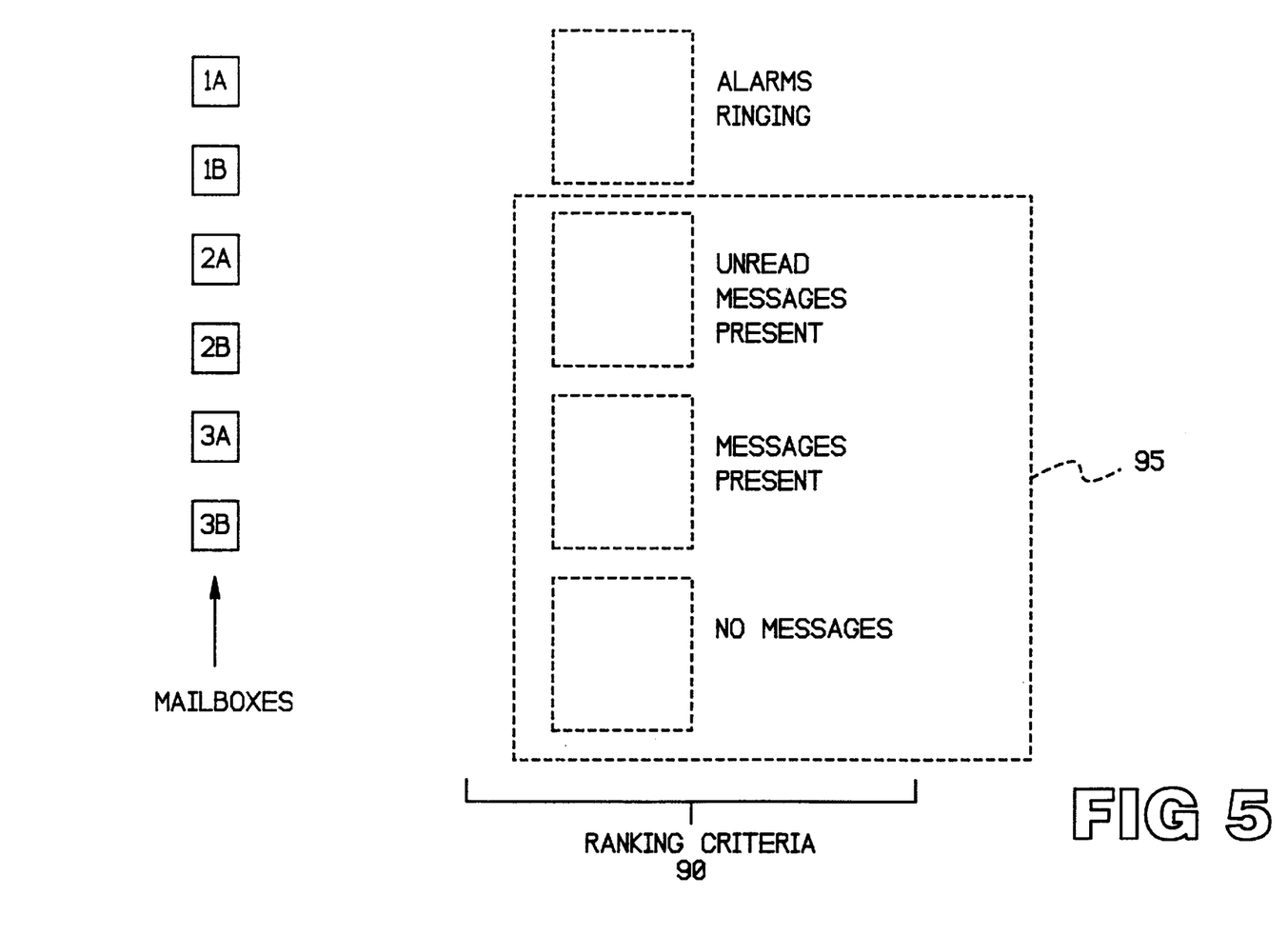
FIG. 5 illustrates prioritizing of mailboxes, and ranking criteria, for ranking MAILBOXES.

In addition to these features, the Ishmail program allows prioritizing and ranking of the mailboxes. When the user creates mailboxes initially, the user assigns a priority to each mailbox. In the preferred embodiment, MULTIPLE priorities are available: such as first (highest), second, and third. FIG. 5 illustrates six mailboxes, on the left side, and their assigned priorities, indicated by numbers. Mailboxes 1A and 1B are assigned first priority. Mailboxes 2A and 2B are assigned second priority, and so on.

In addition, the invention establishes a ranking system, indicated on the right side of FIG. 5. Four ranking criteria 90 are indicated, with "ALARMS RINGING" as the highest rank and "NO MESSAGES" as the lowest rank.

Figure 6:
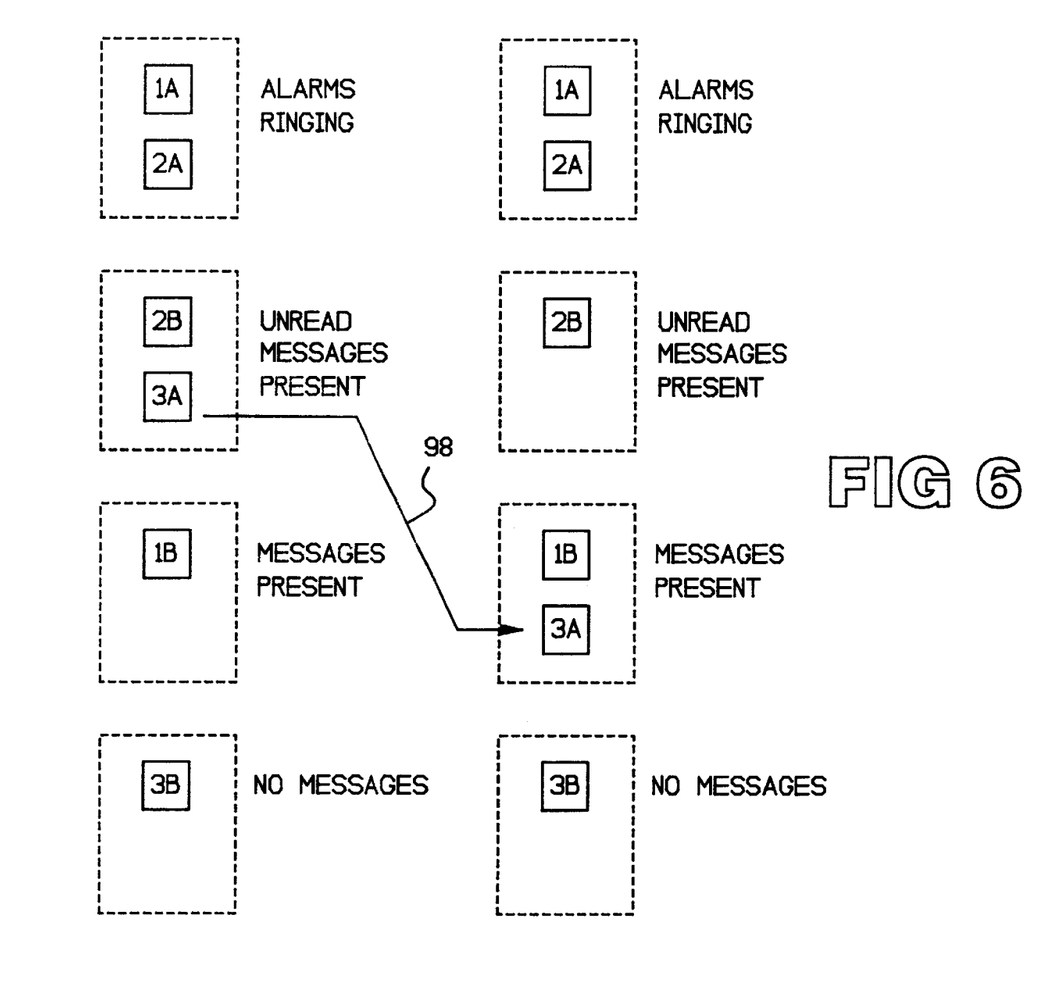
FIG. 6 illustrates dynamic re-ordering of MAILBOXES, in response to user activity.

The invention groups each mailbox into one of the ranks. Then, within each rank, the invention lists the mailboxes in order of priority. FIG. 6 provides an example.

On the left side of FIG. 6, mailboxes 1A and 2A are grouped into the "ALARMS RINGING" rank. Then, since mailbox 1A has a higher priority than mailbox 2A, mailbox 1A is listed first within this rank. Mailboxes 2B and 3A are grouped into the "UNREAD MESSAGES PRESENT" rank. Then, since mailbox 2B has a higher priority than mailbox 3A, mailbox 2B is listed first within this rank, and so on.

After prioritizing and ranking, when the invention displays the list of these MAILBOXES to the user, the invention presents the list in the exemplary order shown on the left side of FIG. 6. That is, mailbox 1A is listed first, mailbox 2A next, and mailbox 3B last.

Now, the user may take action with respect to the list. For example, the user may read the messages in mailbox 3A. After the user reads these messages, the invention changes the rank of mailbox 3A, as indicated by arrow 98, because that mailbox no longer contains unread messages. Now, the presentation of the user's list of mailboxes is made according to the ranking shown on the right side of FIG. 6.

The ranks identified by dashed box 95 in FIG. 5 are based on pre-defined criteria, namely, whether a given mailbox contains (1) unread messages, (2) messages, or (3) no messages. However, the highest rank, "ALARMS RINGING," is not based on pre-defined criteria, but on criteria under control of the user.

That is, the user establishes conditions under which alarms are triggered. When an alarm is triggered, the corresponding mailbox is grouped into this highest rank. Several examples of alarm-triggering conditions are the following:

a) As one type of condition, the user can set a threshold number for a mailbox, based on any of the following exemplary parameters:
  i) total messages contained in the mailbox,
  ii) number of unread messages in the mailbox,
  iii) number of messages to which the user has not responded in the mailbox,
  iv) total characters contained in the mailbox,
  V) date of oldest unread message in the mailbox, and so on.

When a parameter for a mailbox exceeds the respective threshold, an alarm is triggered.

b) As another type of condition, the user can, in effect, specify that, when a particular character string is found in a particular field of a message, an alarm is triggered. To implement this condition, the user would take two steps: (1) create a mailbox into which messages are sorted if they contain the character string, and (2) set the threshold for this mailbox to zero, so that an alarm is triggered whenever a message reaches this mailbox.

c) In the general case, as explained in Appendices A and B, the condition can be set by any measurable, searchable characteristic of the e-mail messages contained in the mailbox.

Interface

It is expected that a user who receives a large volume of e-mail will create multiple mailboxes, and that, as time progresses, they will accumulate a significant supply of messages. In order to allow the user to manipulate the messages, the invention provides the interface shown in FIG. 3.

Figures 3, 3B:
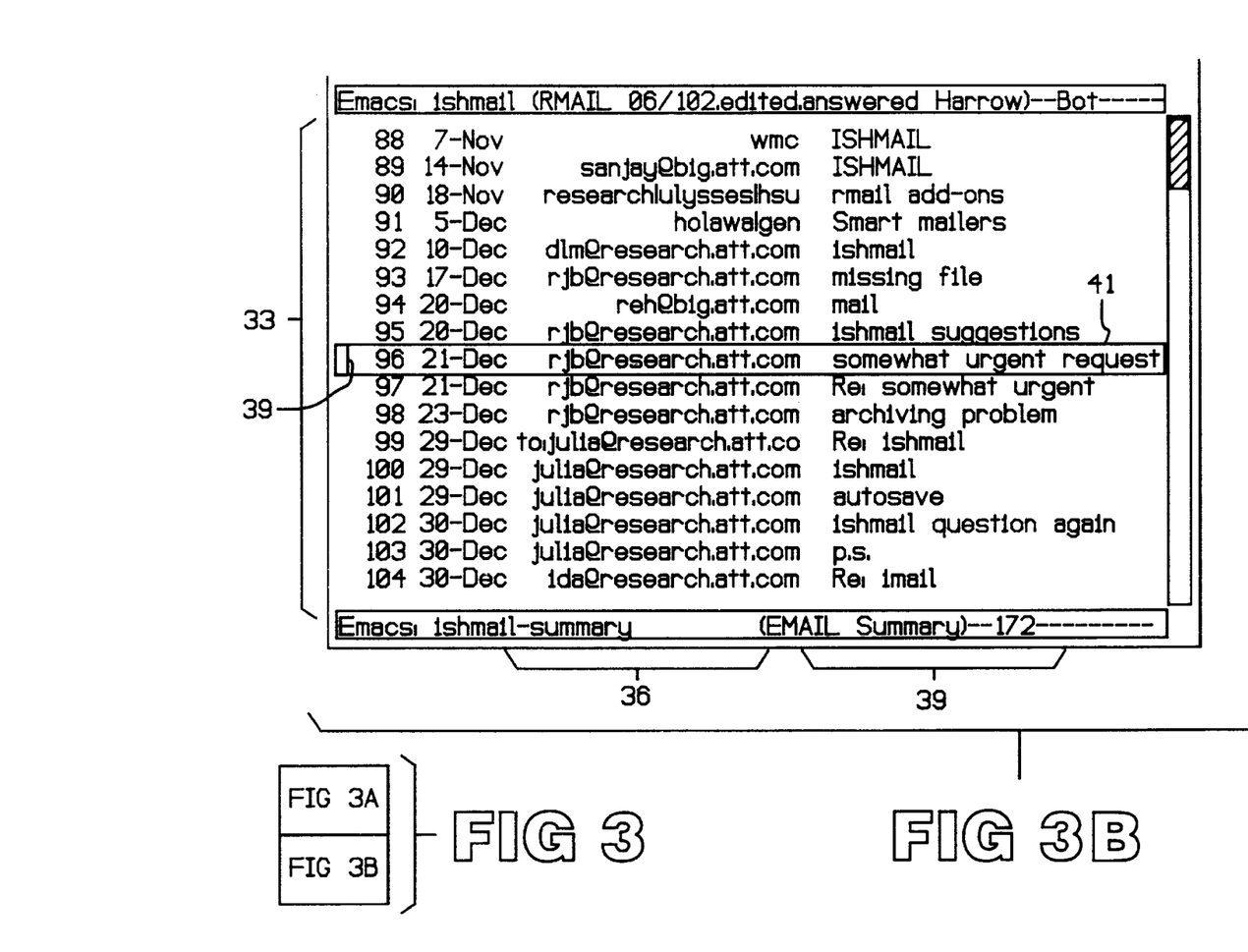
FIG. 3 illustrates a display used as an interface by one form of the invention.
Figure 3A:
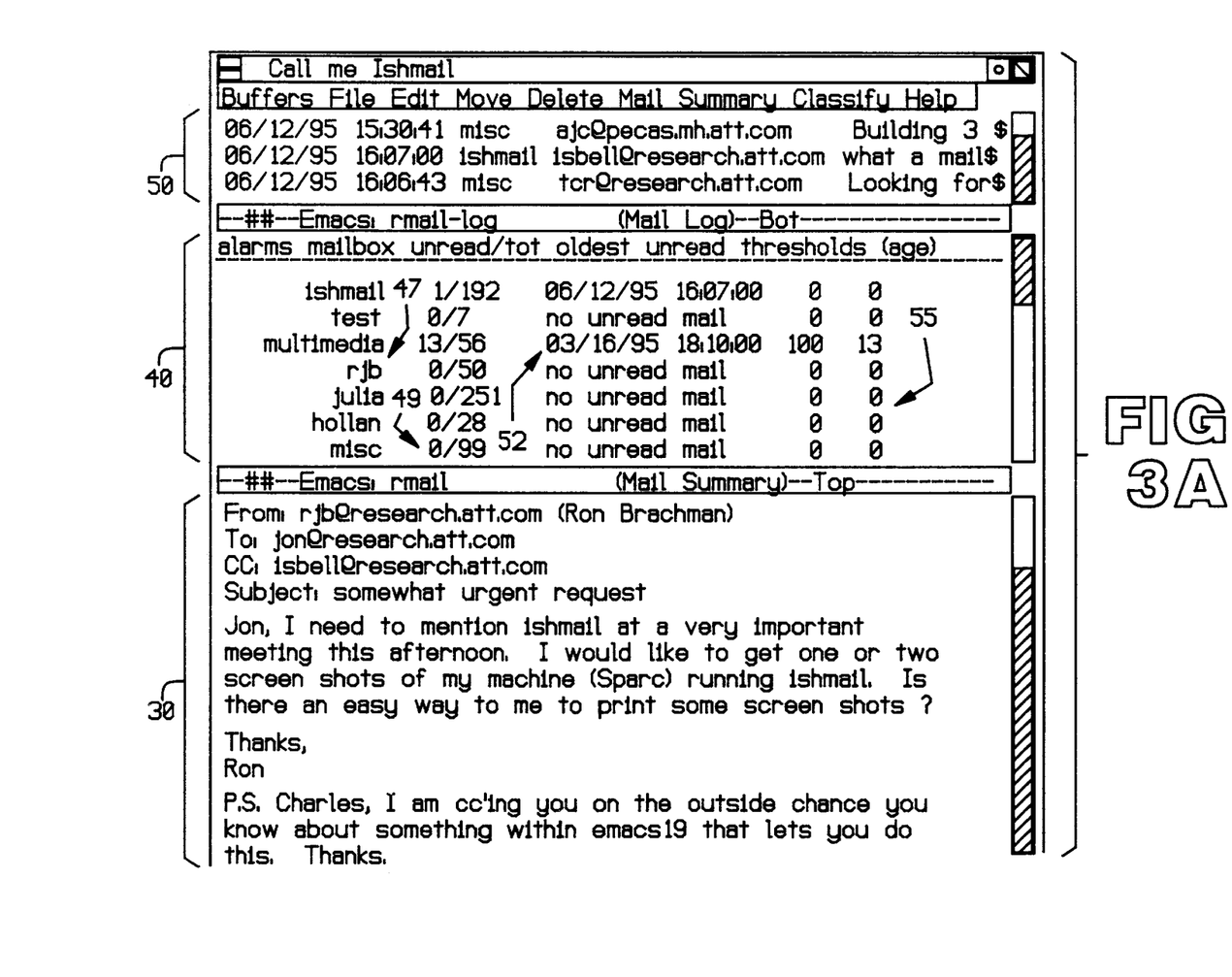

The interface contains four windows. Window 30 displays the current message selected by the user. This message is analogous to the message shown in FIG. 2.

Window 33 contains the headers of the messages stored in the mailbox currently selected. (A mailbox is selected in window 40, and the selection procedure is discussed below.) FIG. 2 illustrates an exemplary header 18. In window 33, the entries of column 39 correspond to the entries of field 18D in FIG. 2, the subject field. If no subject field exists, as when the sender of the message did not create a subject field, then the first line of the message is treated as the subject field.

In window 33, the entries of column 36 correspond either to (a) the entries of field 18A in FIG. 2, if the message was received from a remote location, or (b) to the entries of field 18B, if the message was sent by the user. The entries in column 36 in FIG. 3 designated by the word "to" indicate mailboxes containing outgoing messages. However, outgoing and incoming mailboxes can both be sorted into the same mailbox if desired.

The user can highlight a message header in window 33 by moving a cursor 39 to the desired message, causing the message to be highlighted by bar 41. The user can then select the highlighted message, as by clicking the pointing device used to move the cursor 39. Upon selection in window 33, the invention displays the selected message in window 30. Thus, header-window 33 represents a table of contents of the currently selected mailbox, and allows the user to select, and display in window 30, any message listed in the table.

Window 40 lists the existing mailboxes, and selected data about them. This list is somewhat analogous to that of header-window 33. Header-window 33 lists the messages contained in the currently selected mailbox, together with selected data about the messages. Window 44 lists the mailboxes contained within the system, which were defined by the user, and lists selected data about them.

Window 40 contains (1) a column 47 indicating the names of the mailboxes; (2) a column 49 indicating both the number of unread messages, and the total number of messages, within each mailbox; (3) a column 52 indicating the time/date stamp of the oldest unread message; (4) two columns labeled 55.

Within the latter, the left column refers to the maximum number of unread messages which are allowed to accumulate in the mailbox, before an alarm is triggered. One way to signal an alarm is to cause a specific icon to appear on the user's computer display, such as one stating "The 'Boss' mailbox is now full." Of course, if the threshold is zero, then the alarm is triggered whenever a new message is received. The user specifies the threshold in the manner indicated in APPENDIX A.

In a preferred embodiment, in FIG. 3, window 40, a textual character, such as an asterisk or "plus sign," is placed into the column labeled "Alarms," adjacent the name of a mailbox, to signal an alarm's having been triggered for that mailbox.

The right column represents another type of threshold, namely, the age in days of the oldest unread message. When the oldest unread message reaches this age, another alarm is triggered.

Window 50 contains a chronological log of incoming messages. The messages are listed in order of their arrival times. Each entry (or row) contains the time/date stamp time, the mailbox to which the message has been assigned, the origin of the message (or the destination, if sent by the user), and the subject of the message (or the first line of the message, if there is no subject). The origin and the subject correspond to the sub fields 18A and 18D in FIG. 2, respectively.

The user can select any line corresponding to a mailbox in either of windows 40 or 50, and the invention will update the remaining two windows in response, by displaying, in window 33, a list of messages contained in the selected mailbox, and, in window 30, the full text of the first unread message on the list.

Additional Considerations

1. "Mailbox" definitions. The term "mailbox" refers to a virtual entity. No physical "boxes" exist, nor does paper "mail" exist. One definition of "electronic mailbox" is a collection of messages, usually implemented as a file, capable of containing a concatenation of one or more messages.

Another definition is a storage location, capable of receiving and storing concatenations of messages, which is assigned to a specific individual, and which is thus distinguishable from other similar storage locations.

2. Checking for running of second program. As discussed in Appendix B in greater detail, upon initiation of an Ishmail program, the invention checks whether the initiating user is running another Ishmail program. This checking is done because it is considered undesirable to run two programs, or processes, which maintain access to common files.

For example, the user may have run the Ishmail program at the user's office, but have left the office without terminating the program. It is possible that the "office" Ishmail program holds an e-mail message which has been modified, or has instructions to delete an e-mail message. If the user generates, or modifies, the same e-mail message using an Ishmail program at the user's home, it is possible that the "office" Ishmail program may later unexpectedly impose its modifications, or deletion, upon the e-mail message.

The invention prevents this problem by establishing a control file when Ishmail is initiated. The control file can be viewed as a flag which is set, indicating that an Ishmail program has been launched. Using a control file has the advantage that it is detectable by the second Ishmail program.

The "home" Ishmail program notices control file, and inquires whether the user wishes to take control. If not, then the "home" Ismail program exits, leaving the messages undisturbed.

If the user does wish to take control, the "office" Ishmail program is ordered to exit, and takes all actions as if manually terminated.

3. Sorting of current messages. During operation of Ishmail by a user, new messages may arrive in the spool of the e-mail program 3 in FIG. 1. The Ishmail program checks for new messages, downloads them, and then sorts them into the proper mailboxes.

4. Sorting of outgoing mail. The Ishmail program offers the option of allowing the user to treat the user's own outgoing mail as incoming mail. That is, the outgoing mail is sorted, using the pre-established filters, into the predefined mailboxes, which are ranked and prioritized, as described above.

5. Searching. The invention provides two types of searching, upon two different types of entities. The first type of searching examines the fields of the messages, and sorts the messages into mailboxes, based on field content, as described above. The second type searches the messages, once classified in a mailbox, and can be used to trigger alarms.

The invention can search for any detectable characteristic of a character sequence. Some exemplary searches are the following:

A. A search for a particular name, such as "Wilson," in a particular field, or in all fields.

B. A search for a particular sequence of characters, such as "James A. Wilson," in a particular field, or in all fields.

C. A search for a particular sequence of characters, which includes "wild cards." For example, if the character "?" represents a wild card, a search can be made for the name "James Wilson," irrespective of the middle initial, by the search string "James ?? Wilson."

D. Boolean key-word searching can be done. For example, a search can be done for the word "James," but only if it occurs within ten words, preceding or following, the word "Wilson."

E. A search can be done for a specific word, located at a specific position within a field. For example, the search can inquire whether the name "Wilson" occurs in the third position of a given field.

F. A search can be done for a message having a given length, such as 1,000 characters.

In the general case, a search can be viewed as a pattern-matching process, wherein a search is done for any definable pattern of characters contained within the messages. Of course, the pattern need not be explicitly set forth, but can be defined by a rule or a mathematical definition.

Also, searching can be done upon the contents of any mailbox. The contents of a mailbox can be viewed as a collection of messages, as defined above. This collection can be searched, for any measurable parameters, such as content of fields (by pattern matching); lengths of messages, or of individual fields; dates of arrival; and so on.

APPENDIX C provides details as to establishing searches.

6. Application to voice mail. Voice mail systems are commercially available, wherein incoming telephone messages are received, digitized, and stored as digital files. One voice mail system is sold under the trade name AUDIX, and is available from AT & T Corporation, Indianapolis, Ind.

The invention adds the following features to a standard voice-mail system. After a caller leaves a voice mail message, as indicated by block 145 in FIG. 7, the invention plays an audible prompt to the caller, indicated by block 150, such as "If you wish, please identify yourself by entering your home telephone number into your touch pad." If the caller enters the number, the voice mail system receives the sequence of touch-tones and converts them into an an ASCII character string, using a tone decoder, as in block 153.

As an alternate to prompting the caller for a telephone number, a service such as "caller ID," offered by many telephone companies, can be used to obtain the caller's telephone number.

Figure 7:
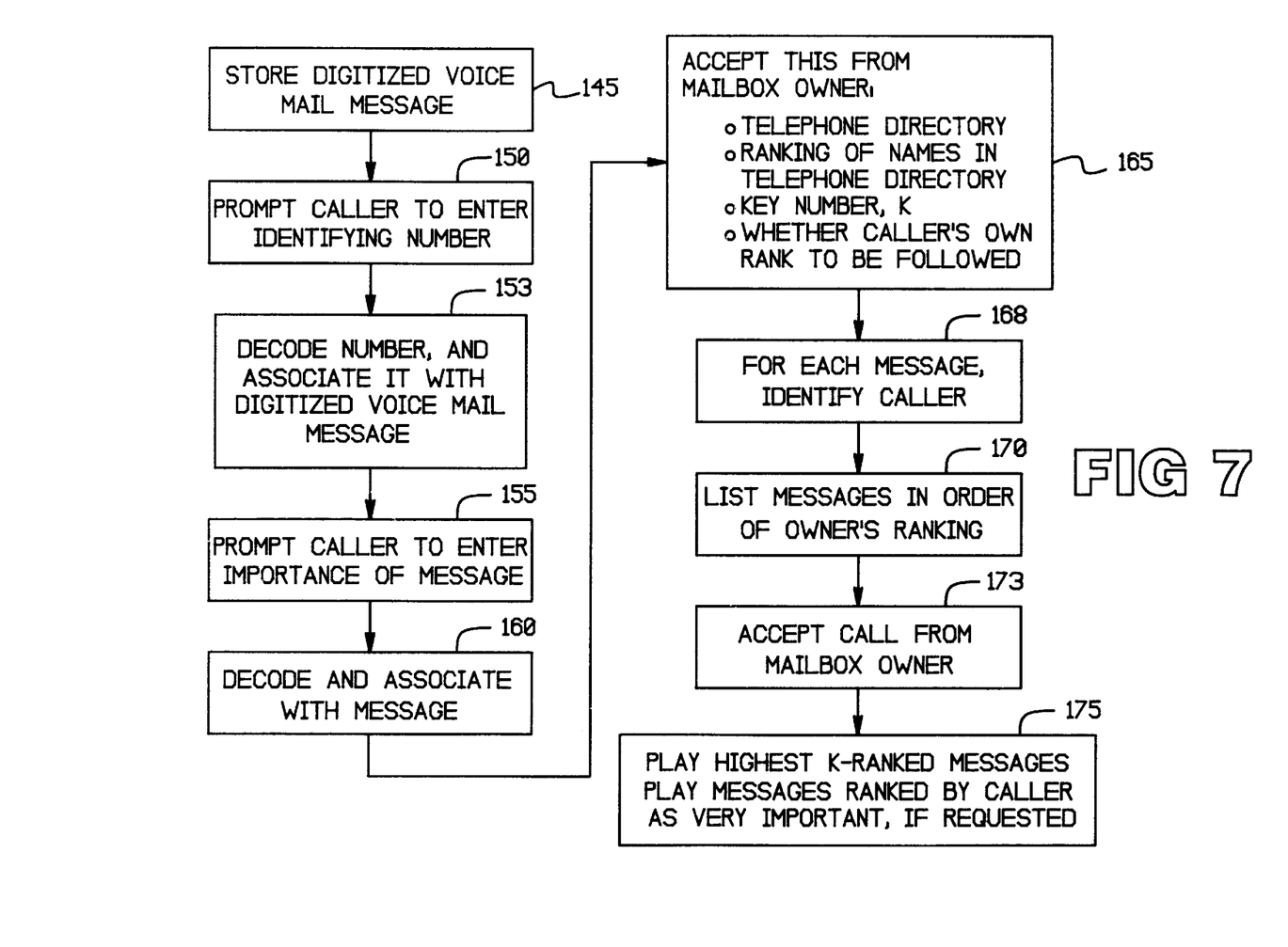
FIG. 7 illustrates a flow chart representing logic undertaken by one form of the invention.

In addition, a second audible prompt is played to the caller, indicated by block 155, such as "If you wish, please identify the category of your message by pressing '1' if your message involves family matters, '2' if your message involves work-related matters, or '3' if your message involves school-related matters." This step allows the caller to assign a category to the message. The particular categories (ie, family matters, etc.) are created by the voice mailbox owner. The caller responds appropriately, and the invention converts the touch-tones to an ASCII code, as indicated by block 160.

The voice mail system associates these responses by the caller with the digitized voice mail message left by the caller, as indicated by blocks 153 and 160.

As indicated by block 165, the voice mail system stores a telephone directory, which is generated by the mailbox owners, and which correlates telephone numbers with the names of the owners of the numbers. This telephone directory allows the invention to ascertain the identity of a caller, by looking up the caller's name, based on the telephone number left by the caller in response to the prompt.

In addition, as indicated by block 165, the voice mail system allows (1) the owner to rank the names in the telephone directory, thereby associating a priority with each expected caller; (2) the owner to specify a key number, which indicates how many messages are to be played in a step later described; and (3) the owner to assign rankings to the categories (family matters, etc.).

In block 168, the invention identifies the caller of each message, based on the telephone directory of block 165. Now, by analogy to an e-mail message, the invention is in possession of (a) information corresponding to field 18A in FIG. 2, by way of ascertaining the callers' identities, (b) a message field 15, in the form of the digitized voice mail message, and (c) a ranking of the message, by way of the caller's own statement of its category (eg, family matters, etc.). The voice-mail message can now be processed in a manner similar to the e-mail messages described above. Block 170 indicates that the messages are ranked in the order specified by the mailbox owner in block 165.

The mailbox owner can call the invention, by telephone, as indicated in block 173. The invention responds by stating, in human-understandable language, the numbers of unread messages within each category, starting with the highest-ranked category, as by saying "You have 3 unread messages in the school-related category, 2 unread messages in the work-related category . . . " and so on.

Then, as indicated in block 175, beginning with the highest-ranked category, the invention, for each unread message in the category, plays the caller's name, which was ascertained in block 168, and then waits briefly for a signal from the owner as to whether to play the full message. If no signal is received, the invention proceeds to the next unread message. When the supply of unread messages becomes exhausted in one category, the invention repeats the process for each lesser-ranked category.

This embodiment allows an owner of a voice mailbox to retrieve, by telephone, only the messages which are considered most important, and to ignore the others. This embodiment (i) allows callers who leave messages to assign a category to each message, and, (ii) later, plays the messages to the owner, category-by-category, meaning that messages in one category are played, then messages in another category are played, and so on. Within each category, the messages are played in the order in which the callers were ranked in block 165.

As a result, the invention allows an owner of a voice mailbox to (i) assign ranking to expected callers, (ii) allow callers to assign their messages to categories, (iii) assign ranking to the categories, and (iv) play messages to the owner, category-by-category, according to the caller-rankings within the categories. In effect, the owner ranks messages as to importance to the owner, and the invention presents the messages in that order.

Flow Chart

Figure 4:
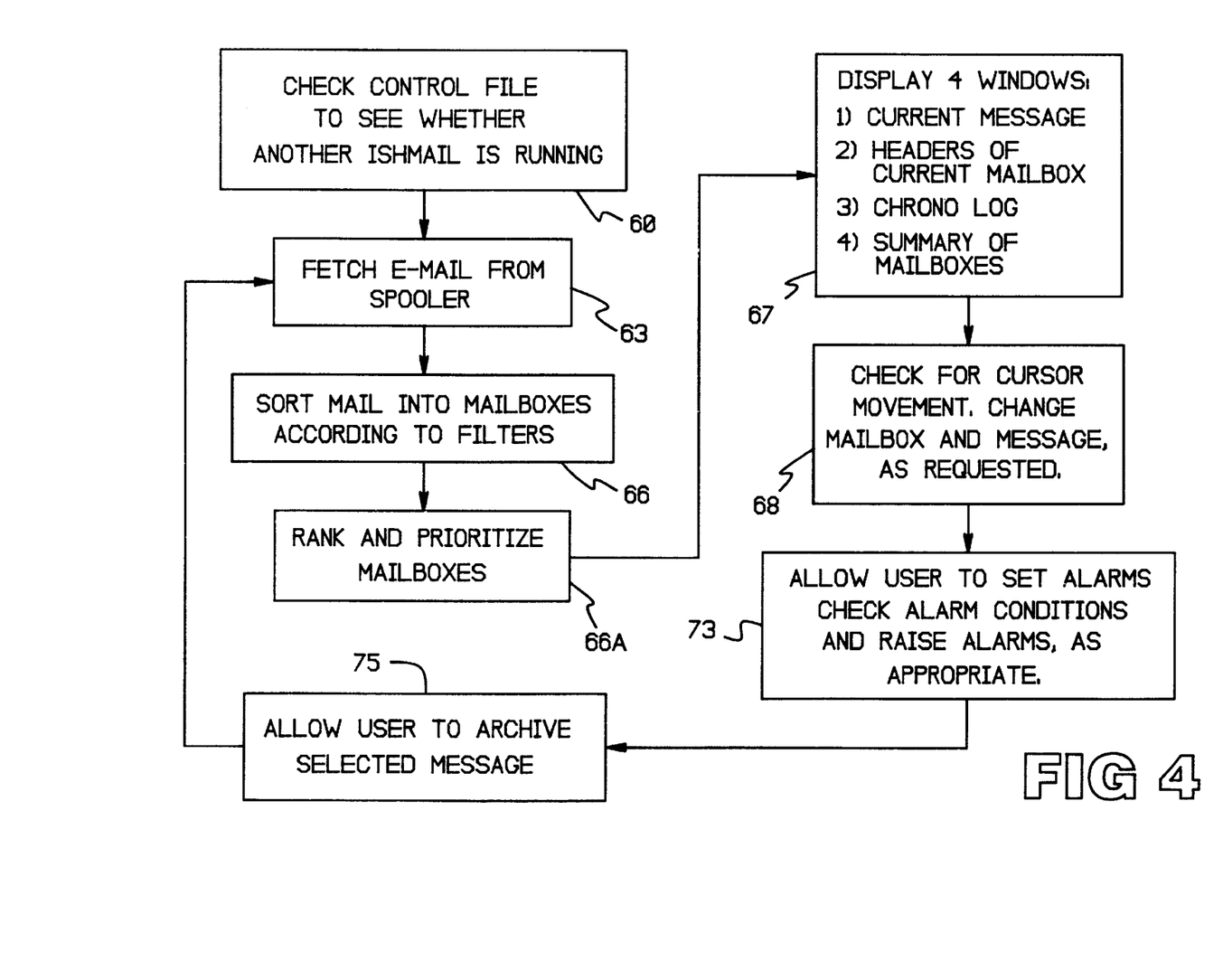
FIG. 4 is a flow chart illustrating selected steps undertaken by the invention.

FIG. 4 illustrates a flow chart undertaken by logic implemented by the computer code attached to this Specification. After a user invokes the Ishmail program, the inquiry of block 60 asks whether the user is running another copy of Ishmail. The inquiry looks for a control file, which is generated by Ishmail, when it initiates. If a control file of a running Ishmail program is found, the user is notified and asked if he wants to take control. If the response is Yes, then the first Ishmail program copies its changes out to disc, and is caused to terminate, and control is taken over by the new Ishmail program.

In block 63, the Ishmail downloads the user's e-mail, which is sorted in block 66, according to the filters established by the user. Block 67 describes the interface display, shown in FIG. 3. Block 68 describes movement of the cursor, by the user, in windows 33 and 40 in FIG. 3, wherein a mailbox is selected, and a message within the mailbox is also selected.

Block 73 refers to setting the alarms shown in column 55 in window 40 in FIG. 3. Block 75 refers to archiving a message by the user. The logic repeats, as indicated by the arrow running from block 75 to block 63.

Numerous substitutions and modifications can be undertaken without departing from the true spirit and scope of the invention. What is desired to be secured by Letters Patent is the invention as defined in the following claims.

We claim:

1. A system for processing e-mail messages, comprising:
   a) means for receiving messages from an e-mail server;
   b) means for sorting messages addressed to a single user into different mailboxes;
   c) means for defining a state for at least one mailbox, based on user input;
   d) means for
      i) displaying indicators of mailboxes currently in the state;
      ii) displaying indicators of mailboxes currently outside the state; and
      iii) changing the displayed indicators, as a user causes mailboxes to enter, and leave, the state,
   wherein display of e-mail messages stored in a mailbox causes the mailbox to leave the state.

2. A method for processing e-mail messages, comprising:
   a) receiving messages from an e-mail server;
   b) sorting messages addressed to a single user into different mailboxes;
   c) defining an alarm state for at least one mailbox, based on user input;
   d) displaying indicators of mailboxes currently in the alarm state;
   e) displaying indicators of mailboxes currently outside the alarm state; and
   f) changing the displayed indicators, as a user causes mailboxes to enter, and leave, the alarm state,
   wherein the user causes the mailboxes to enter and leave the alarm state by displaying e-mail messages stored in the mailboxes.

3. An electronic mail system, comprising:
   a) means for sorting incoming e-mail messages for a single user into a plurality of mailboxes;
   b) display means for
      i) displaying mailboxes having a first characteristic in a first group,
      ii) displaying mailboxes having a second characteristic in a second group;
      iii) displaying the mailboxes in the first group in a first order, based on a first set of priority criteria;
      iv) displaying the mailboxes in the second group in a second order, based on a second set of priority criteria;
   c) means for establishing the first and second sets of priority criteria, based on user input.

4. System according to claim 3, wherein the first characteristic is that a mailbox contain at least one unread message.

5. System according to claim 3, wherein the first characteristic is that a mailbox contain at least one message.

6. System according to claim 3, wherein the first characteristic is that a mailbox contains no messages.

7. An electronic mail system, comprising:
   a) means for receiving e-mail messages from an e-mail server;
   b) means for
      i) associating a search criterion with each of several mailboxes;
      ii) examining each e-mail message for search criteria, and
      iii) sorting e-mail messages meeting a criterion into the mailbox assiciated with that criterion;
   c) display means for
      i) displaying mailboxes containing unread messages in a first group;
      ii) displaying mailboxes containing messages in a second group;
      iii) displaying mailboxes containing no messages in a third group,
      iv) displaying the mailboxes in the first group in a first order, based on a first set of priority criteria;
      v) displaying the mailboxes in the second group in a second order, based on a second set of priority criteria;
   c) means for establishing the first and second sets of priority criteria, based on user input.

\* \* \* \* \*